: US008374545B2

(12) United States Patent
Menegoli et al.

(10) Patent No.: US 8,374,545 B2
(45) Date of Patent: Feb. 12, 2013

(54) DE-TUNING IN WIRELESS POWER RECEPTION

(75) Inventors: Paolo Menegoli, San Diego, CA (US); Linda S Irish, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 12/778,028

(22) Filed: May 11, 2010

(65) Prior Publication Data

US 2011/0053500 A1    Mar. 3, 2011

Related U.S. Application Data

(60) Provisional application No. 61/239,418, filed on Sep. 2, 2009, provisional application No. 61/257,770, filed on Nov. 3, 2009.

(51) Int. Cl.
*H04B 5/00* (2006.01)
*H04B 1/16* (2006.01)

(52) U.S. Cl. .................. 455/41.1; 455/343.1

(58) Field of Classification Search .......... 455/41.1, 455/41.2, 572, 373, 343.1, 573; 307/104, 307/107
See application file for complete search history.

(56) References Cited

U.S. PATENT DOCUMENTS

| 6,047,214 | A | 4/2000 | Mueller et al. | |
|---|---|---|---|---|
| 6,321,067 | B1 * | 11/2001 | Suga et al. | 455/41.2 |
| 7,919,886 | B2 * | 4/2011 | Tanaka | 307/104 |
| 7,975,907 | B2 * | 7/2011 | Yoshida | 235/375 |
| 2006/0187049 | A1 | 8/2006 | Moser et al. | |
| 2009/0210035 | A1 | 8/2009 | Gelbart | |
| 2009/0286475 | A1 * | 11/2009 | Toncich et al. | 455/41.1 |
| 2010/0181961 | A1 * | 7/2010 | Novak et al. | 320/108 |
| 2010/0194206 | A1 * | 8/2010 | Burdo et al. | 307/104 |
| 2010/0201189 | A1 * | 8/2010 | Kirby et al. | 307/9.1 |
| 2010/0201201 | A1 * | 8/2010 | Mobarhan et al. | 307/104 |
| 2010/0201202 | A1 * | 8/2010 | Kirby et al. | 307/104 |
| 2010/0201314 | A1 * | 8/2010 | Toncich et al. | 320/108 |

FOREIGN PATENT DOCUMENTS

| EP | 0558316 A1 | 9/1993 |
|---|---|---|
| EP | 0829940 A2 | 3/1998 |
| EP | 1026832 | 8/2000 |
| FR | 2782209 | 2/2000 |

OTHER PUBLICATIONS

International Search Report and Written Opinion—PCT/US2010/047747—ISA/EPO—Nov. 22, 2011.

* cited by examiner

*Primary Examiner* — Sonny Trinh

(74) *Attorney, Agent, or Firm* — Knobbe, Martens, Olson & Bear, LLP

(57) ABSTRACT

Exemplary embodiments are directed to wireless power transfer. A receiver with a receive antenna couples with near field radiation in a coupling-mode region. The receiver generates an RF signal at a resonant frequency responsive to the near field radiation. A de-tuning circuit generates a variable impedance responsive to a control signal to modify the RF signal to a smaller amplitude or to a different resonant frequency. A rectifier converts the modified RF signal to a DC signal. A comparator creates a feedback loop by generating the control signal responsive to comparing the DC signal to a reference voltage. The de-tuning circuit may operate in digital mode or in linear mode with the feedback. An impedance element may be coupled to the de-tuning circuit to generate a voltage proportional to a current through the de-tuning circuit. The proportional voltage is rectified to a receive signal with information sent from a transmitter.

30 Claims, 9 Drawing Sheets

DE-TUNING IN WIRELESS POWER RECEPTION

CLAIM OF PRIORITY UNDER 35 U.S.C. §119

This application claims priority under 35 U.S.C. §119(e) to:

U.S. Provisional Patent Application 61/239,418 entitled "LINEAR DE-TUNING INVENTION DISCLOSURE" filed on Sep. 2, 2009, the disclosure of which is hereby incorporated by reference in its entirety.

U.S. Provisional Patent Application 61/257,770 entitled "DE-TUNING DEVICE CURRENT TO RECEIVE RADIO FREQUENCY SIGNALS" filed on Nov. 3, 2009, the disclosure of which is hereby incorporated by reference in its entirety.

BACKGROUND

1. Field

The present invention relates generally to wireless charging, and more specifically to devices, systems, and methods related to allocating power to receiver devices that may be located in wireless power systems.

2. Background

Typically, each battery powered device such as a wireless electronic device requires its own charger and power source, which is usually an alternating current (AC) power outlet. Such a wired configuration becomes unwieldy when many devices need charging.

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects the radiated power and rectifies it for charging the battery. Antennas are generally of resonant length in order to improve the coupling efficiency. This approach suffers from the fact that the power coupling falls off quickly with distance between the antennas, so charging over reasonable distances (e.g., less than 1 to 2 meters) becomes difficult. Additionally, since the transmitting system radiates plane waves, unintentional radiation can interfere with other systems if not properly controlled through filtering.

Other approaches to wireless energy transmission techniques are based on inductive coupling between a transmit antenna embedded, for example, in a "charging" mat or surface and a receive antenna (plus a rectifying circuit) embedded in the electronic device to be charged. This approach has the disadvantage that the spacing between transmit and receive antennas must be very close (e.g., within thousandths of meters). Though this approach does have the capability to simultaneously charge multiple devices in the same area, this area is typically very small and requires the user to accurately locate the devices to a specific area.

For many wireless charging systems, the power transmitted from the source is fixed to a single level, thus the power level generally cannot be adjusted to accommodate devices with different maximum peak power levels. This limits the types of devices that can be charged. Another problem is that fixed radiated power levels cannot be adjusted as a function of the device's current battery level. This wastes power since as the battery charges it needs less and less power to complete the charge.

Efficiency is of importance in any power transfer system. Since wireless power transmission is often less efficient than wired transfer, efficiency is of an even greater concern in a wireless power transfer environment.

As a result, when attempting to provide power to one or more wireless charging devices, there is a need for methods and apparatuses for adapting to changes in coupling between a transmit antenna and a receive antenna to optimize or otherwise adjust power delivery to a receiver device coupled to a receive antenna. Furthermore, there is a need to electromagnetically conceal a receive antenna from the transmit antenna, completely or partially, such that the receive antenna draws a reduced amount of power from the transmit antenna.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Exemplary embodiments of the invention described herein include apparatuses and methods that can adapt to different battery charging needs based on potential usage of a battery powered device, actual usage of the battery powered device, or a combination thereof. Furthermore, some exemplary embodiments include wireless power delivery to such devices.

Figure 1:
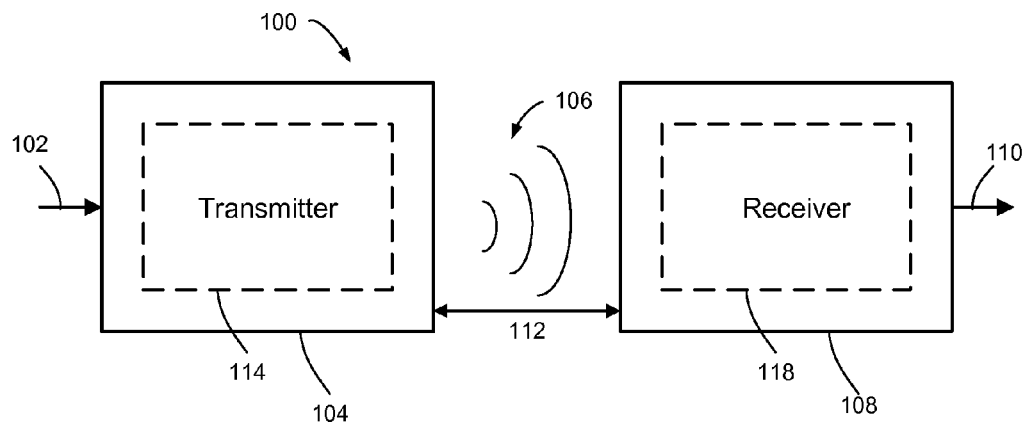
FIG. 1 shows a simplified block diagram of a wireless power transfer system.

Exemplary embodiments of the invention described herein include apparatuses and methods that can adapt to changes in coupling between a transmit antenna and a receive antenna to optimize or otherwise adjust power delivery to a receiver device coupled to a receive antenna. Furthermore, exemplary embodiments of the invention electromagnetically conceal a receive antenna from the transmit antenna, completely or partially, such that the receive antenna draws a reduced amount of power from the transmit antenna FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
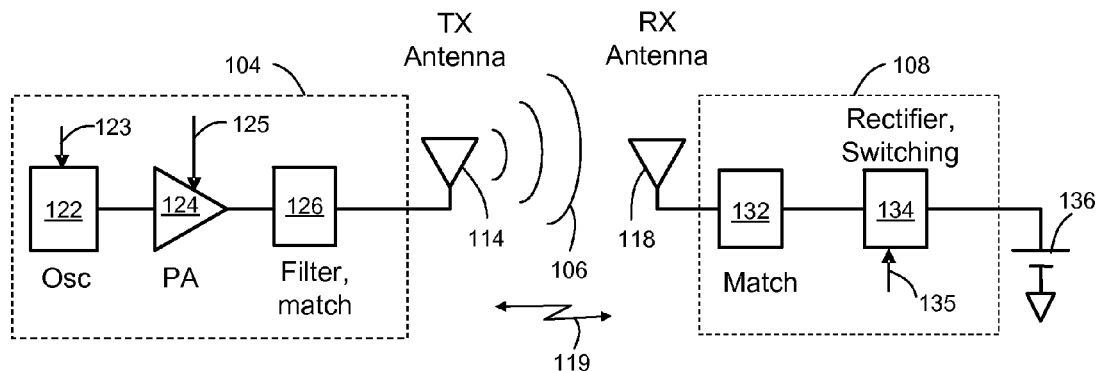
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
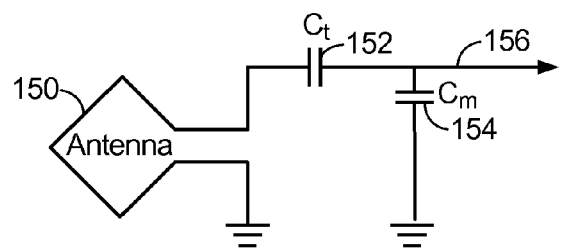
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the disclosure include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the disclosure, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >40%) to a small Rx antenna at significantly larger distances than allowed by far field and inductive approaches mentioned earlier. If the Tx antenna is sized correctly, high coupling levels (e.g., 40% to 70%) can be achieved when the Rx antenna on a host device is placed within a coupling-mode region (i.e., in the near-field) of the driven Tx loop antenna.

Figure 4:
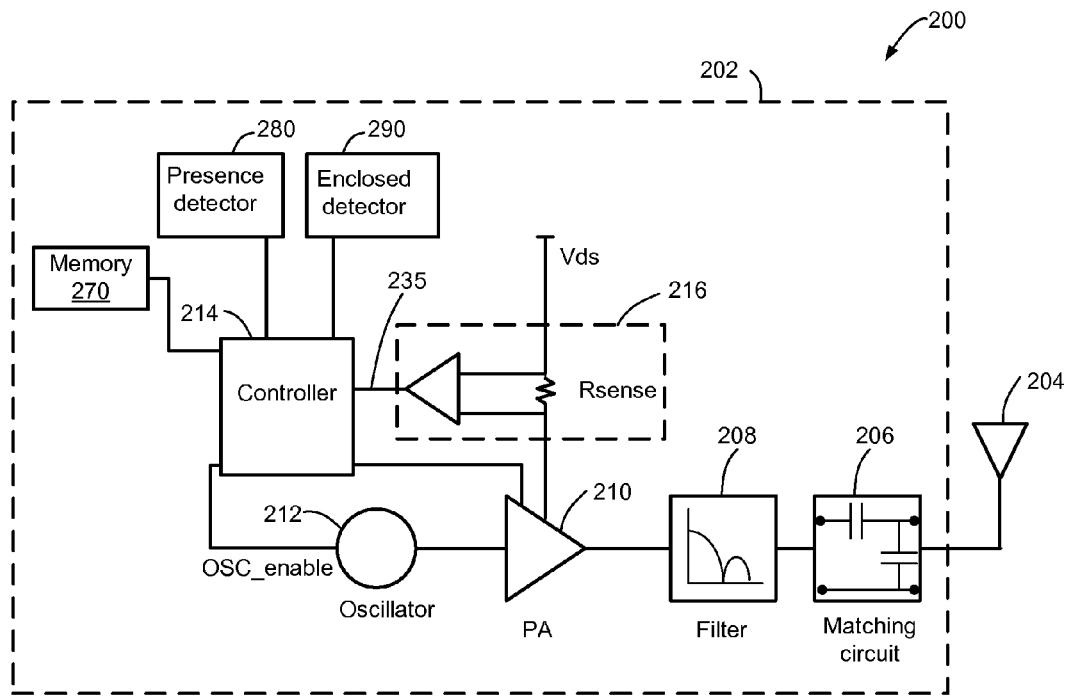
FIG. 4 is a simplified block diagram of a transmitter, in accordance with an exemplary embodiment of the present invention.

FIG. 4 is a simplified block diagram of a transmitter 200 (also referred to herein as a wireless power transmitter), in accordance with an exemplary embodiment of the present disclosure. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes an impedance matching circuit 206 for matching the impedance of the transmit circuitry 202 (e.g., 50 Ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 to 8.0 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, by creating a voltage drop across a resistor ($R_{sense}$), which is affected by the presence or absence of active receivers in the vicinity of the near-field generated by transmit antenna 204. Detection of changes to the loading on the power amplifier 210 are generated at a comparator output 235 and monitored by the controller 214 for use in determining whether to enable the oscillator 212 for transmitting energy to communicate with an active receiver. In other words, the comparator output 235 can indicate presence or absence of receive antennas in the near field of the transmit antenna as well as detect communications from the receive antennas based on fluctuations in the comparator output 235, as explained more fully below.

The transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., a fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the receive device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

The transmit circuitry 202 may include a memory 270 for storing, as non-limiting examples, software for the controller 214, information about the transmitter 200, information about transmit operations, and information about receivers that are placed in the vicinity of the transmitter 200, communicate with the transmitter 200, or combinations thereof.

Figure 5:
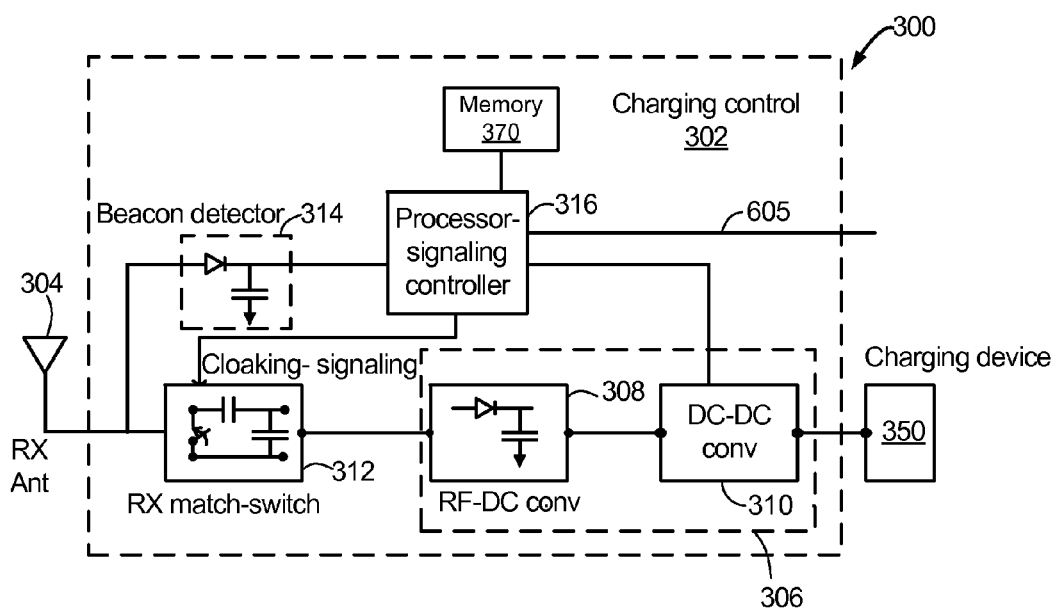
FIG. 5 is a simplified block diagram of a receiver, in accordance with an exemplary embodiment of the present invention.

FIG. 5 is a simplified block diagram of a receiver 300, in accordance with an exemplary embodiment of the present disclosure. The receiver 300 includes receive circuitry 302 and a receive antenna 304. Receiver 300 further couples to device 350 with a charging signal 340 for providing received power to the device 350. It should be noted that receiver 300 is illustrated as being external to device 350 but may be integrated into device 350. Generally, energy is propagated wirelessly to receive antenna 304 and then coupled through receive circuitry 302 to device 350.

The receive antenna 304 is tuned to resonate at the same frequency, or near the same frequency, as the transmit antenna 204 (FIG. 4). The receive antenna 304 may be similarly dimensioned with the transmit antenna 204 or may be differently sized based upon the dimensions of the associated device 350. By way of example, device 350 may be a battery powered device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

The receive circuitry 302 provides an impedance match to the receive antenna 304. The receive circuitry 302 includes power conversion circuitry 306 for converting a received RF energy source into charging power on the charging signal 340 for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver using the near-field refers to a device sensing and charging control mechanism, rather than conventional two-way communication. In other words, the transmitter uses on/off keying of the transmitted signal to adjust whether energy is available in the near-field. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of the receiver 300 may also occur upon the occurrence of other events including detection of an external wired charging source (e.g., wall/USB power) providing charging power to device 350. The processor 316, in addition to controlling the cloaking of the receiver, may also monitor beacon circuitry 314 to determine a beacon state and extract messages sent from the transmitter. The processor 316 may also adjust DC-to-DC converter 310 for improved performance. The processor 316 may also determine charging profiles for the device 350 and track device charging history, as is explained more fully below.

In some exemplary embodiments, the receive circuitry 320 may signal a power requirement, as explained more fully below to a transmitter in the form of, for example, desired charge start times, desired charge durations, desired charge end times, desired power level, maximum power level, desired current level, maximum current level, desired voltage level, and maximum voltage level. Based on these levels, and the actual amount of power received from the transmitter, the processor 316 may adjust the operation of the DC-DC converter 310 to regulate its output in the form of adjusting the current level, adjusting the voltage level, or a combination thereof.

The receive circuitry 302 may include a memory 370 for storing, as non-limiting examples, software for the processor 316, information about the receiver 300, and information about wireless power receive operations.

A particularly efficient communication method between transmitter and receiver is by in-band transmitter and receiver load modulation which can be sensed by the other device. By in-band, it is meant that the information is exchanged completely within the frequency channel allocated for wireless charging. That is, generally no external radio link, operating at a different frequency and radiating the data into free space, is needed. The addition of an external radio link will impact size, cost, and complexity of the wireless charging system, and will likely lead to over the air radio transmission and interference issues as well. In-band signaling avoids these problems. In implementing in-band load modulation however, there is a problem of effectively and correctly detecting changes in load impedance. This is particularly true of signaling from the receiver to the transmitter device (reverse link signaling). To ensure that the data being sent is correctly received, a robust method of signal detection is needed.

Signaling in the forward direction (i.e., transmitter to receiver) is straightforward since each device is receiving a large signal from the transmitter. Signaling in the reverse direction (i.e., receiver to transmitter) can be more problematic. Some methods, such as modulation of receiver impedance, can be used to change Voltage Standing Wave Ratio (VSWR) or reverse loss seen by the transmitter, but detecting the change in transmitter power, voltage, or current can be difficult, since it is often difficult to predict what a given configuration of devices, orientations, and receiver designs will do to those parameters. For example, a system where a device causes a change in impedance such that power increases during signaling may change to a decrease if the device is very close to the edge of the coil, or if the device is placed too close to another device. These changes make decoding of the reverse signal difficult, if not impossible.

Figure 6A:
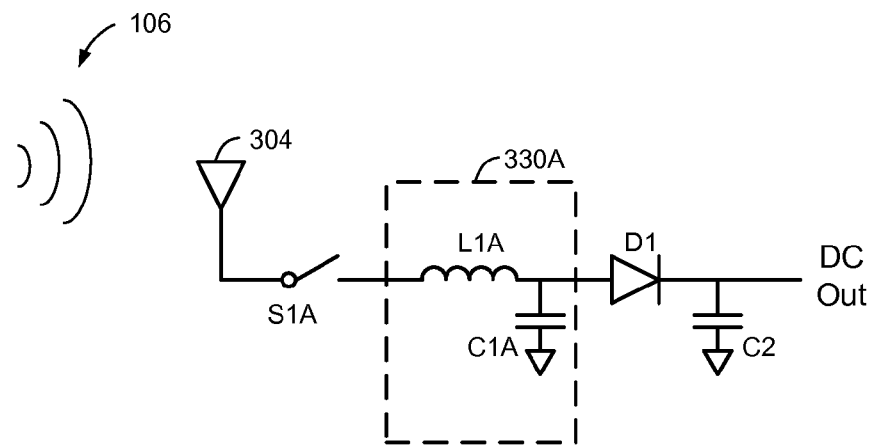
FIGS. 6A and 6B show simplified schematics of portions of receive circuitry for providing reverse-link signaling, cloaking, or a combination thereof.
Figure 6B:
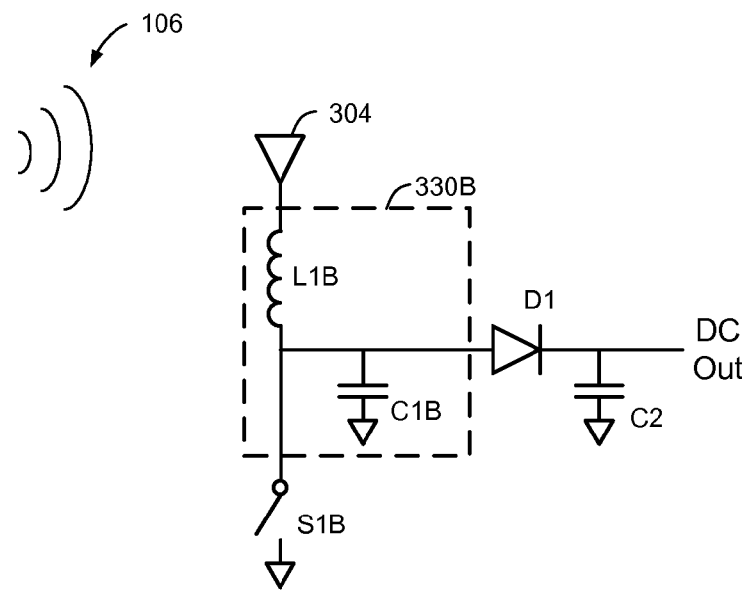

FIGS. 6A and 6B show simplified schematics of portions of receive circuitry for providing reverse-link signaling, cloaking, or a combination thereof. These reverse-link signaling circuits are shown as examples of possible circuits for providing cloaking and signaling by tuning and de-tuning the receive antenna. Many other circuits for providing the reverse-link signaling to the transmitter by receive antenna tuning are possible and contemplated as within the scope of the present invention.

The circuit in FIG. 6A includes a receive antenna 304, a resonance circuit 330A and a de-tuning switch S1A coupled between the receive antenna 304 and the resonance circuit 330A. The resonance circuit 330A includes an inductor L1A and a capacitor C1A and is configured to resonate at a specific frequency when the de-tuning switch S1A is closed and the receive antenna 304 is excited by electromagnetic radiation 106 at or near the specific frequency.

A diode D1 and a capacitor C2 act as a rectifier to provide a substantially constant DC output signal 309 for providing power to a receiver device (not shown) for charging, powering, or a combination thereof. The receiver can provide reverse-signaling to the transmitter by opening de-tuning switch S1A to de-tune (i.e., cloak) the receive antenna or closing de-tuning switch S1A to tune (i.e., uncloak) the receive antenna.

The circuit in FIG. 6B includes a receive antenna 304, a resonance circuit 330B and a de-tuning switch S1B. The resonance circuit 330A includes an inductor L1B and a capacitor C1B and is configured to resonate at a specific frequency when the de-tuning switch S1B is open and the receive antenna 304 is excited by electromagnetic radiation at or near the specific frequency. The de-tuning switch S1B is coupled between the inductor L1B and the capacitor C1B and coupled to ground such that the resonance circuit is shorted when the de-tuning switch S1B is closed or configured to resonate when the de-tuning switch S1B is open.

A diode D1 and a capacitor C2 act as a rectifier to provide a substantially constant DC output signal 309 for providing power to a receiver device (not shown) for charging, powering, or a combination thereof. The receiver can provide reverse-signaling and cloaking to the transmitter by closing de-tuning switch S1B to de-tune (i.e., cloak) the receive antenna or opening de-tuning switch S1B to tune (i.e., uncloak) the receive antenna. As non-limiting examples, the switches (S1A and S1B) may be implemented as Metal Oxide Semiconductor (MOS) transistors.

Details of some other exemplary embodiments for cloaking signals, beacon signals, and circuits for generating these signals can be seen in U.S. Utility patent application Ser. No. 12/249,873, entitled "Reverse link signaling via receive antenna impedance modulation" filed on Oct. 10, 2008; in U.S. Utility patent application Ser. No. 12/249,861, entitled "Transmit power control for a wireless charging system" filed on Oct. 10, 2008; and in U.S. Utility patent application Ser. No. 12/249,866 entitled "Signaling charging in wireless power environment" filed on Oct. 10, 2008; all of which are herein incorporated by reference in their entirety.

In order to transfer power wirelessly with acceptable ranges of efficiency, high Q resonant circuits and careful impedance matching may be required. The high Q components and circuits generally are needed to minimize the power dissipation in the resistive parasitic elements, while the impedance matching minimizes the reflected power at the points of impedance mismatch.

Figure 7:
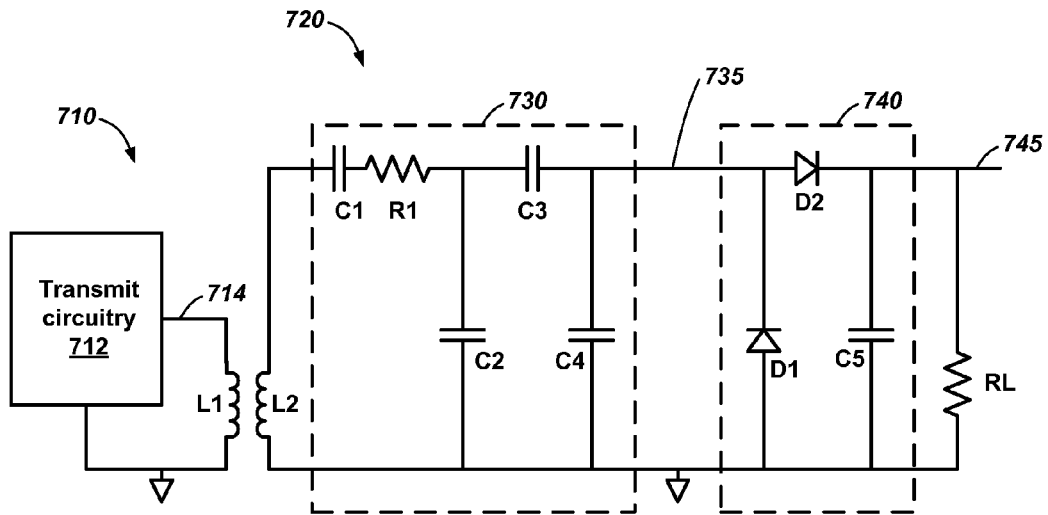
FIG. 7 is a simplified circuit diagram of a wireless power transmitter with a transmit antenna and a wireless power receiver with a receive antenna.

FIG. 7 is a simplified circuit diagram of a wireless power transmitter 710 with a transmit antenna and a wireless power receiver 720 with a receive antenna. In FIG. 7, the transmitter 710 may include transmit circuitry 712 similar to that of transmit circuitry 202 in FIG. 4. Inductor L1 represents a transmit antenna and inductor L2 represent a receive antenna. A matching and resonance circuit 730 may include passive devices, such as, for example, capacitors C1, C2, C3, and C4 and resistor R1 to match the impedance of the receive antenna L2 and create a resonance circuit so the wireless power receiver 720 will resonate with a high Q and generate an RF signal 735 at the frequency transmitted by the transmit antenna L1. A rectifier 740 may include devices such as, for example, diodes D1 and D2 and capacitor C5 to rectify the RF signal 735 from the matching and resonance circuit 730 into a DC signal 745 suitable for use by a battery, other circuitry of a receiver device, or a combination thereof. The resistor RL represents a load on the DC signal 745 from elements, such as, for example, the battery and other circuitry.

Ideally, the wireless power receiver 720 should be closely tuned to the frequency of the wireless power transmitter 710. The close tuning is generally obtained by selecting the tank components to resonate at the transmitting frequency. Ideally, at the resonating frequency, the impedance of the front end of the wireless power receiver 720 is zero and the voltages and currents in the antenna may reach very high values even if the coupling between the receiving and the transmitting antenna is not very high.

In several circumstances, however, the need to de-tune the wireless power receiver 720 from the transmitting signal may arise. For example, depending on the system, there may be more than one receiver operating at the same time and in order to maximize the power to one specific receiver, the others may have to de-tune or "cloak," as described above. When one receiver is cloaked it becomes substantially concealed from the transmitter, and the reflected impedance at the transmitter antenna for the effect of the cloaked receiver becomes very high.

One effective way of de-tuning the receiver is by moving the resonating frequency away from the transmitted frequency. Since the circuits involved have high Q characteristics, their bandwidth is quite narrow and a simple shift in the frequency causes the transmitted power to fall quickly. Moving the frequency is equivalent to applying different values of capacitance and inductance to the LC resonating circuit, but this is difficult to achieve with minimum cost and with simple circuits.

Another way to cloak the receiver is to turn on a MOS transistor fully (like the switch S1B in FIG. and 6B) so that the low "on" resistance of the transistor effectively shorts out a portion of the resonating circuit capacitance, shifting its resonating frequency. Once the frequency is moved away from the transmit signal, power dissipation in the switch may be extremely low.

In some cases, wireless power receivers 720 may need to absorb only a portion of the full power coming from the transmitter, such as providing just a trickle charge to a battery when the transmitter is transferring power to multiple devices. Conventionally, a Zener diode could be used to clamp the received power level for low power devices. However, such a non-regulated clamping technique merely introduces inefficiencies and non-linearities into the receiver. Accordingly, it may be useful to provide linear de-tuning to substantially cloak the device from the transmitter, while still providing a small amount of power to the receiver device. Exemplary embodiments of the disclosure are directed to substantially linear de-tuning of the wireless power receiver 720.

Figure 8:
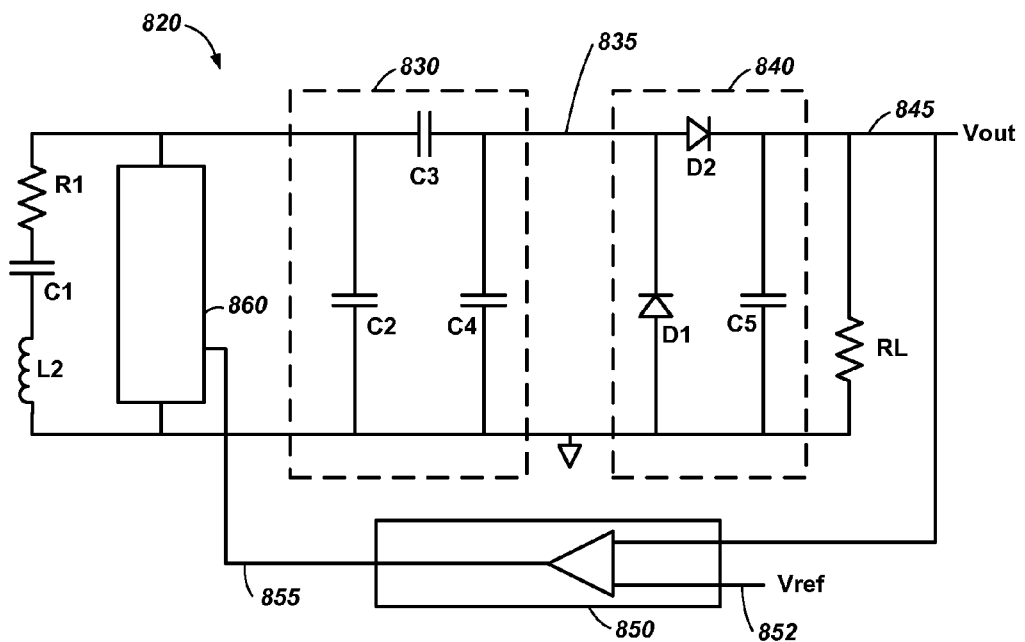
FIG. 8 is a simplified diagram of a wireless power receiver and a de-tuning circuit according to one or more exemplary embodiments of the present invention.

FIG. 8 is a simplified diagram of a wireless power receiver 820 and a de-tuning circuit 860 according to one or more exemplary embodiments of the present invention. To reduce complexity in the drawings, the wireless power transmitter for driving the receive antenna L2 is not shown. In FIG. 8, a matching circuit may include passive component, such as, for example, C1 and R1 to match an impedance of the receive antenna L2 and a resonance circuit 830 may include passive devices, such as, for example capacitors C2, C3, and C4 to create a resonance circuit so the receiver will resonate with a high Q and generate an RF signal 835 at the frequency received by the receive antenna L2. A rectifier 840 may include devices such as, for example, diodes D1 and D2 and capacitor C5 to rectify the RF signal 835 from the matching and resonance circuit 830 into a DC signal 845 suitable for use by a battery, other circuitry of a receiver device, or a combination thereof. The resistor RL represents a load on the DC signal 745 from elements, such as, for example, the battery and other circuitry.

An analog comparator 850 includes a first input coupled to the DC signal 845 and a second input coupled to a voltage reference signal 852 (Vref). An output of the analog comparator is a control signal 855 that feeds back to the de-tuning circuit 860. The de-tuning circuit 860 operates in parallel with the antenna and the resonance circuit 830 to create a modified RF signal 835 that has a reduced Q at the resonance frequency of the receive antenna L2, has a resonance at a frequency different from the primary resonance frequency, or a combination thereof. The de-tuning circuit 860 includes a variable impedance between the RF signal 835 and the ground. The variable impedance varies in response to the control signal 855.

The feedback in FIG. 8 creates a circuit that may control a voltage, a current, or other parameter by the means of a negative feedback loop. For simplicity of explanation, non-limiting examples herein are directed primarily toward voltage controlled feedback. However, feedback related to current control and power control also may be used. The feedback loop linearly controls the de-tuning circuit 860 such that the wireless power receiver 820 is partially de-tuned from the optimal power capable of being drawn from the receive antenna L2.

Figure 9:
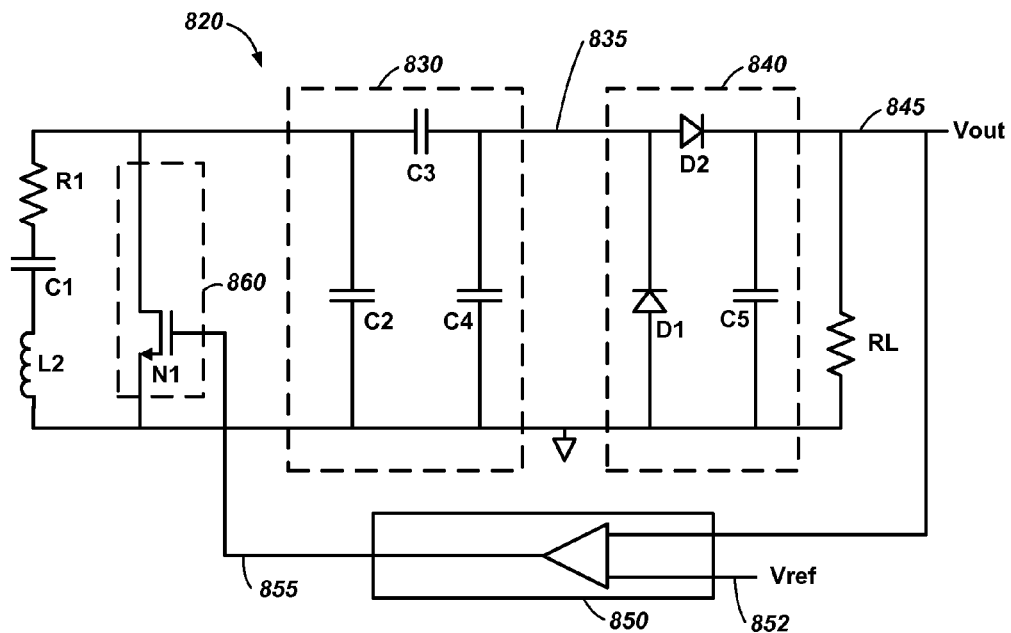
FIG. 9 is a simplified diagram of a wireless power receiver and a de-tuning circuit including an NMOS transistor as a variable impedance device according to one or more exemplary embodiments of the present invention.

FIG. 9 is a simplified diagram of a wireless power receiver 820 and a de-tuning circuit 860 including an NMOS transistor N1 as a variable impedance device according to one or more exemplary embodiments of the present invention. The transistor N1 operates in the linear region such that the current between the source and drain of the NMOS transistor N1 is substantially proportional to the voltage on the control signal 855. Other devices in the wireless power receiver 820 are the same as those described above with reference to FIG. 8 and need not be described again.

The variable resistance through NMOS device N1 modifies the resonance characteristics of the wireless power receiver 820 to vary the amount of power actually received on the DC signal. An NMOS transistor is used as one exemplary embodiment, however other devices may be used, such as, for example, a PMOS device, bipolar transistors, and bipolar junction field effect transistors.

Figure 10:
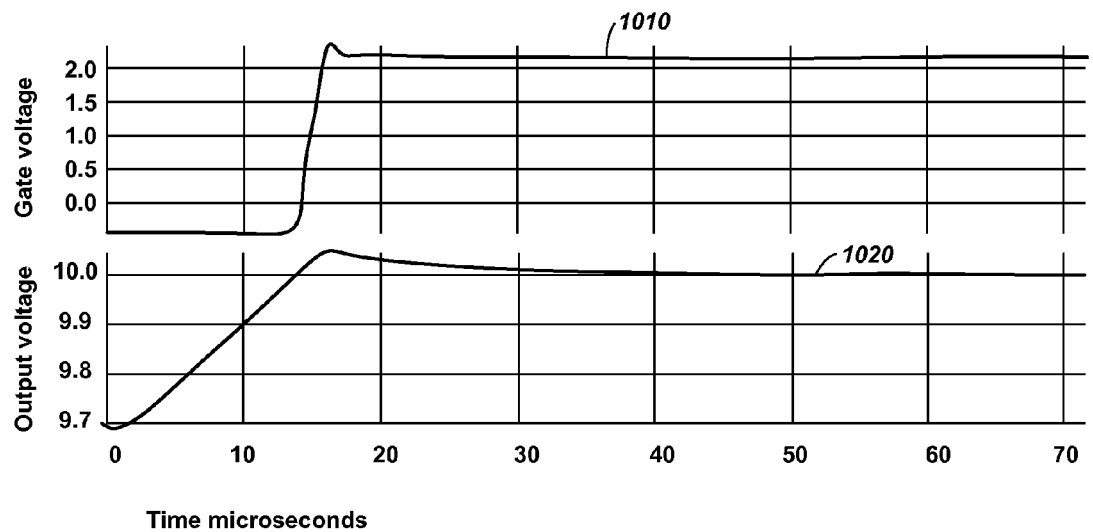
FIG. 10 is a graph of an output voltage and a feedback voltage for the exemplary embodiment of FIG. 9.

FIG. 10 is a graph of an output voltage and a feedback voltage for the exemplary embodiment of FIG. 9. Reference is made to both FIGS. 9 and 10 to describe the feedback operation. In FIG. 10, at start up the gate voltage 1010 for transistor N1 is low and the transistor N1 has a very high impedance between the source and drain, which substantially removes effects of the transistor from the tank circuit, creating a high resonance at the frequency of the tank circuit and receive antenna.

With the resonance, the rectifier 840 begins generating an increasing output voltage 1020 on the DC signal 845, which increases as the resonance increases. As the output voltage 1020 increases to near the reference voltage 852, the analog comparator 850 increases the gate voltage 1010 (i.e., the voltage on the control signal 855). The higher gate voltage 1010 begins to turn on the transistor N1, reducing its impedance, and partially de-tuning the resonance of the wireless power receiver 820.

With a reduced Q, or shift in frequency, for the wireless power receiver 820, the output voltage 1020 will reduce. A steady state is reached wherein the output voltage 1020 is proportional to, and tracks, the reference voltage 852. Thus, if power consumption on the DC signal 845 changes, or power delivery from the transmit antenna changes, the feedback loop modifies the resonance characteristics of the wireless power receiver 820 to maintain a constant voltage.

As a non-limiting example, assume the current through resistor RL increases from 100 mA to 300 mA. The output voltage 1020 would tend to drop due to this increased current. As a result, the feedback through the analog comparator 850 and de-tuning circuit 860 will reduce the current through the transistor N1, creating less de-tuning and increasing the power output to keep the output voltage at the same proportional level relative to the reference voltage 852.

Figure 11:
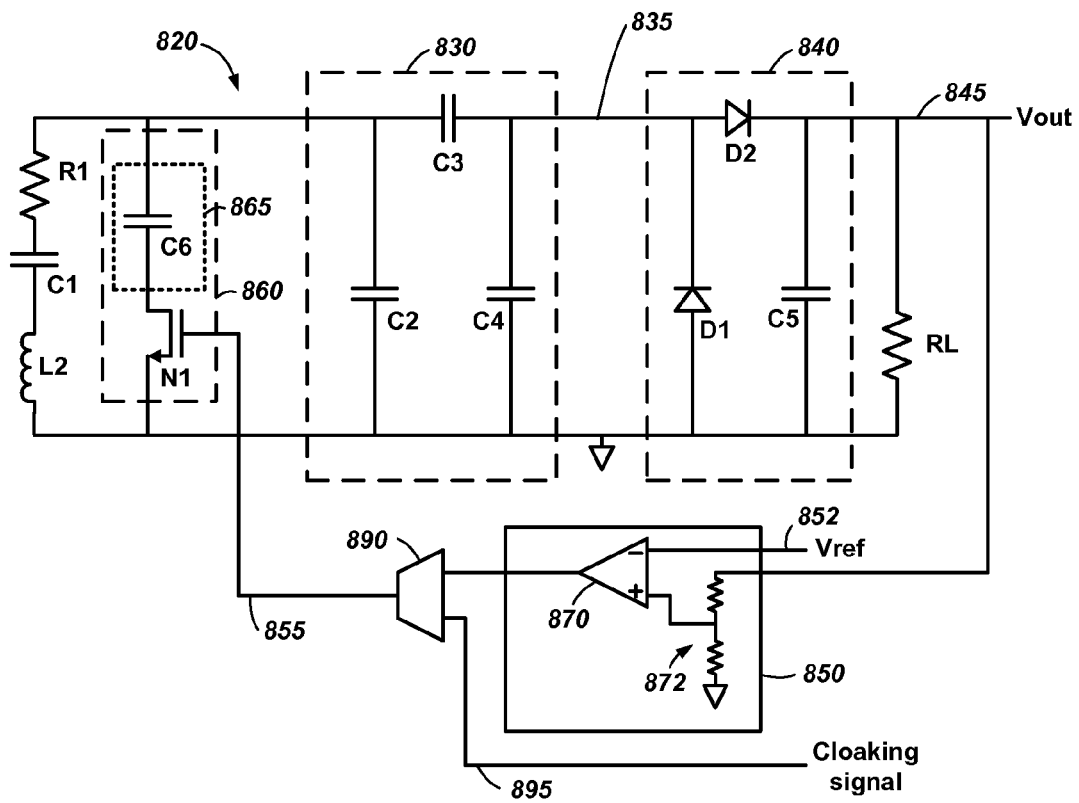
FIG. 11 is a simplified diagram of a wireless power receiver and a de-tuning circuit including a de-tuning network according to one or more embodiments of the present invention.

FIG. 11 is a simplified diagram of a wireless power receiver 820 and a de-tuning circuit 860 including a de-tuning network 865 according to one or more embodiments of the present invention. The de-tuning circuit 860 includes transistor N1 and a de-tuning network 865 in series between the drain of transistor N1 and the RF signal 835. As a non-limiting example, the de-tuning network 865 in FIG. 11 is a capacitor C6 to create a reactive component for the variable impedance along with the resistive component from transistor N1. Of course, other more complex de-tuning networks may be used to create different de-tuning effects.

Adding a series capacitance affects the ability of the wireless power receiver 820 to de-tune the circuit enough to guarantee the output voltage regulation in all the conditions (e.g., high transmitting power and very light receiver loads). Furthermore the series capacitance effect is also dependent on the value of the capacitor C2. In the specific embodiment of FIG. 11, a series capacitor C6 of about 1 nF combined with a capacitance of about 300 pF for capacitor C2 may guarantee voltage regulation and power dissipation in the desired cases for linear de-tuning On the other hand, if the transistor N1 and the series capacitor C6 were connected between L2 and C1, the desired value of the series capacitor C6 may need to be lower.

Figure 13A:
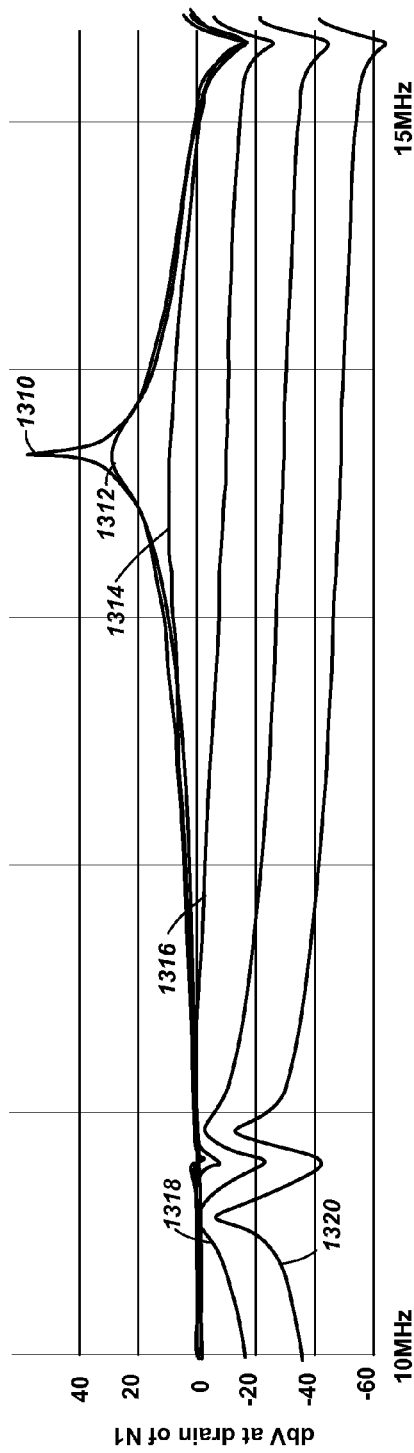
FIGS. 13A and 13B are graphs of signal amplitudes relative to frequency for various values for the variable impedance according to the exemplary embodiments of FIGS. 9 and 11, respectively.
Figure 13B:
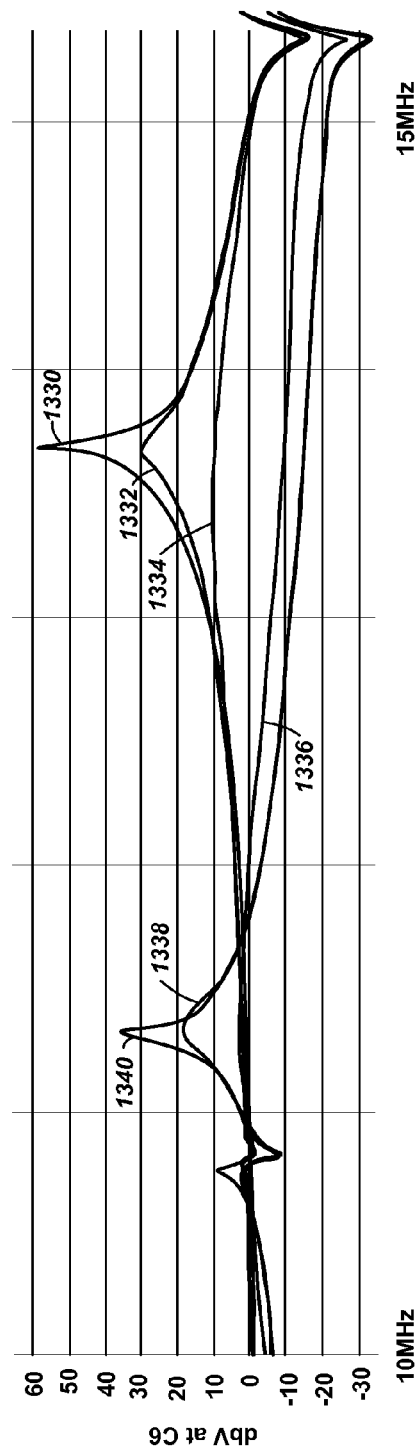

Particular attention should be paid to the power dissipated in the transistor N1. To better understand how the conductance of the transistor affects its power dissipation FIGS. 13A and 13B depict the Q of the receiver circuit for different values of the transistor's equivalent resistance. Details of how the de-tuning circuit of FIGS. 11 and 9 perform are discussed below with reference to FIGS. 13A and 13B.

As a non-limiting example, FIG. 11 also illustrates an exemplary embodiment of a possible analog comparator 850. In FIG. 11 the analog comparator 850 comprises an error amplifier 870 with a voltage divider 872 to set a proportional relationship between the DC signal 845 and the voltage reference 852.

As a non-limiting example, FIG. 11 also illustrates a multiplexer 890 for selecting a linear de-tuning signal from the output of the error amplifier 870 or a digital cloaking signal 895. Thus, when the digital cloaking signal 895 is selected, transistor N1 can be used to perform a digital de-tuning between a tightly tuned circuit and an un-tuned circuit in a manner similar to that of FIG. 6B.

Alternatively, linear de-tuning is selected to provide a linear amount of cloaking Full on/off cloaking may create substantial noise in the reverse link due to the fast switching. Linear de-tuning can create a smoother transition between what is considered a cloaked condition and an un-cloaked condition, which can increase the overall signal-to-noise ratio and efficiency. In addition, a partially-cloaked condition may be selected to still allow a reduced power output on the DC signal 845. Changes between the cloaked, un-cloaked, and partially cloaked condition may be accomplished with the linear de-tuning by adjusting the voltage on Vref, which changes the operation of the feedback loop and, as a result, the resonance characteristics of the wireless power receiver 820.

Alternatively, in the error amplifier embodiment of the analog comparator 850, the voltage divider 872 may be changed to adjust the proportional relationship between the voltage reference 852 and the DC signal 845. Other devices in the wireless power receiver 820 are the same as those described above with reference to FIG. 8 and need not be described again.

Figure 12:
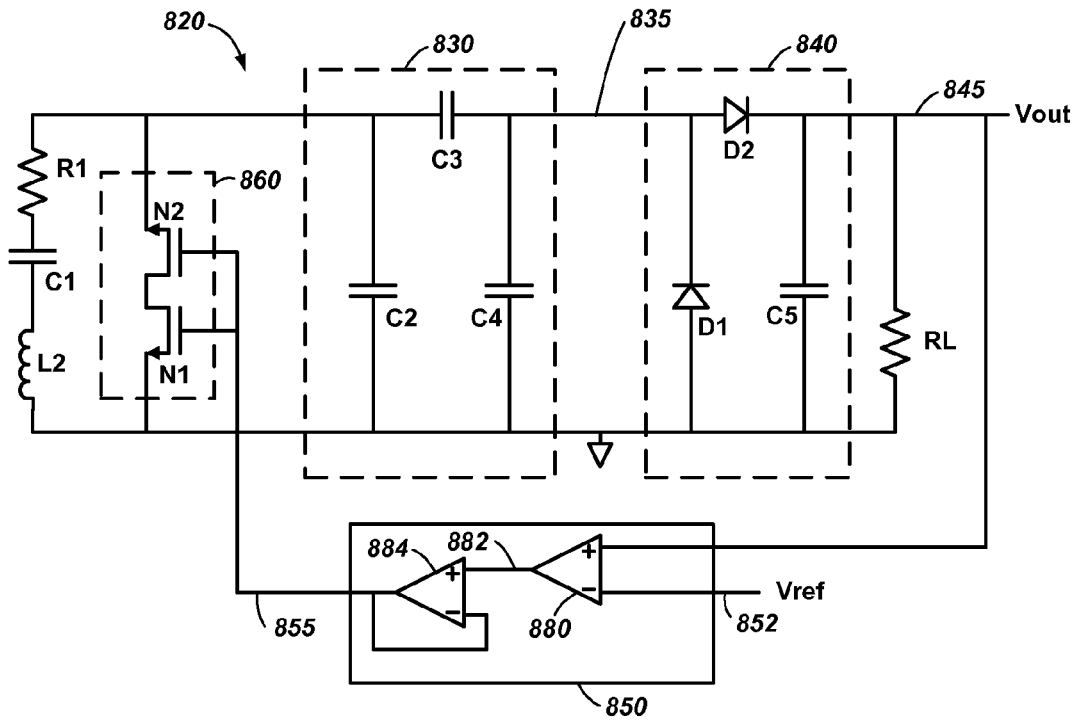
FIG. 12 is a simplified diagram of a wireless power receiver and a de-tuning circuit including two NMOS transistors according to one or more embodiments of the present invention.

FIG. 12 is a simplified diagram of a wireless power receiver and a de-tuning circuit including two NMOS transistors (N1 and N2) according to one or more embodiments of the present invention. MOS devices generally have a small parasitic body diode between the source and drain. Since these MOS transistors are being used in a resonant circuit, current therethrough may go positive and negative, which may cause a rectifying effect due to the parasitic body diode. By using back-to-back transistors N1 and N2 in opposite configurations (i.e., source-to-drain and drain-to-source, the parasitic body diodes are in opposite directions blocking undesired body currents in both directions.

As a non-limiting example, FIG. 12 also illustrates another exemplary embodiment of a possible analog comparator 850. In FIG. 11 the analog comparator 850 comprises an Operational Transconductance Amplifier (OTA) 880 for generating an output current 882 proportional to a difference between the output signal 845 and the reference voltage 852. The output current 882 may be buffered with a unity-gain operation amplifier (or an amplifier with gain) to convert the output current 882 to a suitable voltage on the control signal 855 for driving the gates of transistors N1 and N2. The OTA 880 is a variable current source whose current is dependent on the differential voltage between the DC signal 845 and the voltage reference 852. Other devices in the wireless power receiver 820 are the same as those described above with reference to FIG. 8 and need not be described again.

FIGS. 13A and 13B are graphs of signal amplitudes relative to frequency for various values for the variable impedance according to the exemplary embodiments of FIGS. 9 and 11, respectively. It can be noted that for high values of resistance (higher than a few KOhms) the Q is high at the original resonating frequency. By lowering the resistance, the Q of the circuit decreases in value. By lowering the resistance still further, the resonance peak shifts to lower frequencies. When the resistance is quite low (below 1 Ohm) the Q may increase again. Ideally, the linear de-tuning circuit should avoid the region of lowest Q if and when total power dissipation is a concern. However realistically, the on resistance equivalent when transistor N1 is operating in its saturation region is often higher than 1 Ohm.

The curves of FIG. 13A correspond to different values of impedance for transistor N1 in the exemplary embodiment of FIG. 9. Specifically, curve 1310 illustrates a response for the receiver when the impedance of transistor N1 is about 10 KOhms. Curve 1312 illustrates a response for the receiver when the impedance of transistor N1 is about 1 KOhms. Curve 1314 illustrates a response for the receiver when the impedance of transistor N1 is about 100 Ohms. Curve 1316 illustrates a response for the receiver when the impedance of transistor N1 is about 10 Ohms. Curve 1318 illustrates a response for the receiver when the impedance of transistor N1 is about 1 Ohm. Finally, curve 1320 illustrates a response for the receiver when the impedance of transistor N1 is about 100 mOhms.

The curves of FIG. 13B correspond to different values of impedance for transistor N1 in the exemplary embodiment of FIG. 11. Specifically, curve 1330 illustrates a response for the receiver when the impedance of transistor N1 is about 10 KOhms. Curve 1332 illustrates a response for the receiver when the impedance of transistor N1 is about 1 KOhms. Curve 1334 illustrates a response for the receiver when the impedance of transistor N1 is about 100 Ohms. Curve 1336 illustrates a response for the receiver when the impedance of transistor N1 is about 10 Ohms. Curve 1338 illustrates a response for the receiver when the impedance of transistor N1 is about 1 Ohm. Finally, curve 1340 illustrates a response for the receiver when the impedance of transistor N1 is about 100 mOhms.

Following the example shown in FIG. 13A, the average power dissipated in the switch (i.e., transistor N1) for a load of 1 KOhm and an output voltage regulated at 10V, with a transmitting power in the order of 3 watts can be as high as 330 mW representing a bit more than 10% of the total power. It should be noted that in the depicted representation only one switch is utilized but the same considerations apply to the case when two back to back MOS transistors are utilized.

The described configuration has the advantage that when a full cloak is desired by turning fully on the transistor N1, the resonating frequency is shifted enough to reduce the received power to almost zero. This approach may also be used to maintain good output voltage regulation in presence of a load transient. If the load current is abruptly changed, the linear de-tuning circuit adjusts itself to provide the newly requested power.

It should also be mentioned that by altering the regulated voltage at the output of the receiver, it is possible to linearly de-tune the receiver by intentionally selecting voltages that generate impedance mismatch, further reducing the power dissipated in the detuning device and overall in the receiver. More power would be reflected to the transmitter, not improving the total efficiency of the system, but greatly improving the receiver power dissipation.

This same means of changing the load may be used to reverse signal to the transmitter by changing the impedance without disrupting operations of the receiver block. The minimum load change to be detected by the transmitter as reverse signal can be easily adjusted by using this linear de-tuning method.

Figure 14:
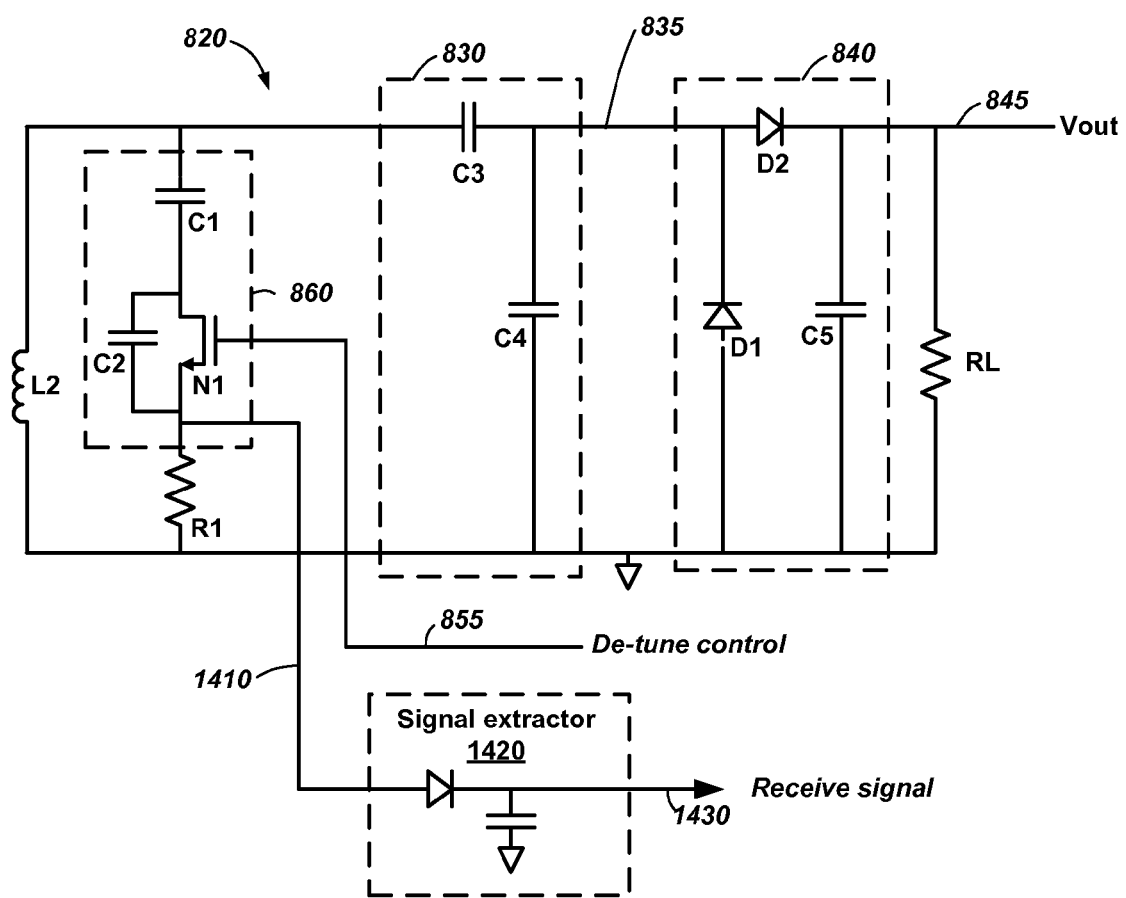
FIG. 14 is a simplified diagram of a wireless power receiver and a de-tuning circuit including a signaling sensor according to one or more exemplary embodiments of the present invention.

FIG. 14 is a simplified diagram of a wireless power receiver 820 and a de-tuning circuit including a signaling sensor according to one or more exemplary embodiments of the present invention. In FIG. 14, a matching and resonance circuit 830 may include passive devices, such as, for example, capacitors C3, and C4 to match the impedance of the receive antenna L2 and create a resonance circuit so the wireless power receiver 820 will resonate with a high Q and generate an RF signal 835 at the frequency transmitted by the transmit antenna L1. In addition, capacitor C1 may be considered part of the matching and resonance circuit 830. A rectifier 840 may include devices such as, for example, diodes D1 and D2 and capacitor C5 to rectify the RF signal 835 from the matching and resonance circuit 830 into a DC signal 845 suitable for use by a battery, other circuitry of a receiver device, or a combination thereof. The resistor RL represents a load on the DC signal 745 from elements, such as, for example, the battery and other circuitry.

The signaling sensor includes transistor N1, an impedance element (e.g., resistor R1), and a signal extractor 1420. The transistor N1 is controlled by a de-tune control 852 and may operate in any of the digital and linear de-tuning modes discussed above. In some exemplary embodiments, capacitor C2 may be include to provide an AC signal bypass around transistor N1 for when transistor N1 is completely off. In some exemplary embodiments, capacitor C2 may not be needed as the drain to source capacitance of transistor N1 may be sufficient for creating an AC bypass path.

In other means for detecting forward link data, the amplitude of received forward link data may become small when the receiver is in the de-turned state. As a result sensing a voltage for the RF signal may be difficult in a de-tuned or partially de-tuned state. This exemplary embodiment can detect forward link signaling from the transmitter while the receiver is tuned, de-tuned, or partially de-tuned using linear de-tuning methods.

In the exemplary embodiment, as shown in FIG. 14, the resistor R1 converts a current through the transistor N1 to a voltage as a modulated signal 1410 that tracks the RF signal 835. The signal extractor 1420 rectifies the modulated signal 1410 to a received signal 1430 containing the data bits sent by the transmitter. By sensing the current through the de-tuning device (e.g., transistor N1), the change in signal amplitude between the de-tuned and tuned states becomes small. The narrower range of signal amplitude improves reception reliability and reduces or eliminates the need for gain control in the receiver. Sensing current in the de-tuning device gives improved data reception when de-tuned while delivering good reception in the tuned state.

Figure 15:
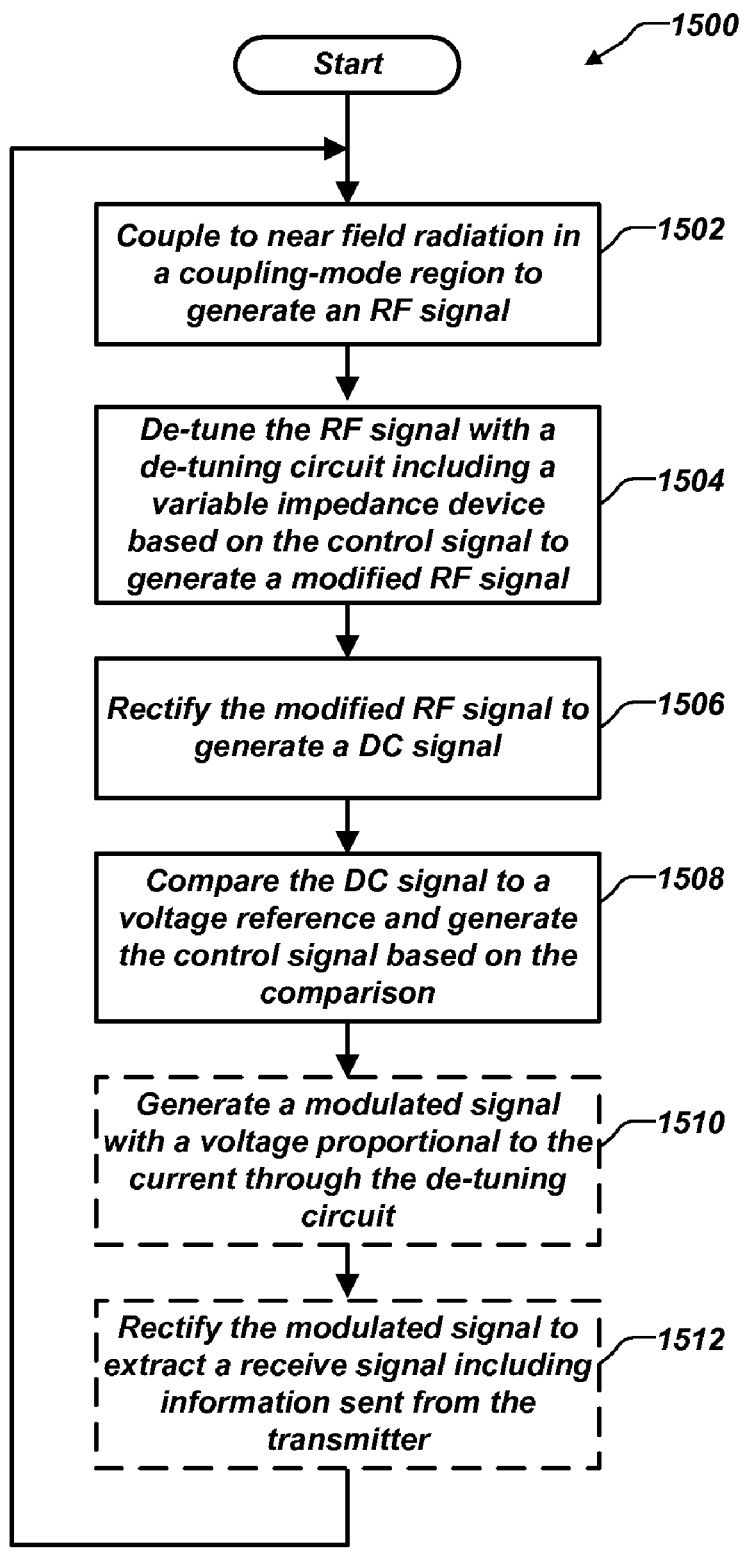
FIG. 15 is a flow chart illustrating a process of linearly de-tuning a wireless power receiver.

FIG. 15 is a flow chart illustrating a process 1500 of linearly de-tuning a wireless power receiver. Reference will also be made to FIGS. 8 and 14 in describing the process 1500. This process 1500 includes operation of an analog feedback loop. As a result, a person of ordinary skill in the art will understand that although the process 1500 is described as discrete acts for ease of description, some or all of these acts may be happening simultaneously and continuously.

In operation 1502, the receive antenna L2 couples to near-field radiation to generate an RF signal 835. In operation 1504, the de-tuning circuit 860, which includes a variable impedance device (e.g., N1), de-tunes the RF signal 835 based on the control signal 855 to modify the RF signal 835. In some exemplary embodiments, the de-tuning may be digital such that the variable impedance is very near zero or very high based on a digital value for the control signal 855. In some exemplary embodiments, the de-tuning may be analog such that the variable impedance can be a continuous analog value responsive to an analog value on the control signal 855. Some exemplary embodiments may include a combination of digital control and analog control.

In operation 1506, a rectifier 840 converts the modified RF signal 835 to a DC signal 845. In operation 1508, the DC signal 845 is compared to a voltage reference 852 to generate the control signal 855 based on the comparison.

In some exemplary embodiments, the process 1500 may optionally include operations 1510 and 1512 to extract information modulated into the near-field radiation by the transmitter. In operation 1510 a modulated signal 1410 is generated by converting a current through the de-tuning circuit 860 (e.g., N1 in the exemplary embodiment of FIG. 14) to a voltage based on a voltage drop proportional to the current through an impedance element (e.g., R1 in the exemplary embodiment of FIG. 14). In operation 1512, the modulated signal is rectified by a signal extractor 1420 to generate a receive signal 1430 with information sent from the transmitter.

Because process 1500 is a continuous loop, the process 1500 repeats continuously while the circuits of exemplary embodiments described herein are in operation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for operating a receiver, comprising:
    generating an RF signal based on power wirelessly received;
    providing a control signal to a variable impedance device configured to modify the RF signal, the control signal having a voltage level, the variable impedance device configured to conduct a current that is proportional to the voltage level;
    rectifying the modified RF signal to generate a DC signal; and
    generating another control signal based on a voltage difference between the DC signal and a reference voltage.

2. The method of claim 1, wherein the providing a control signal to a variable impedance device configured to modify the RF signal further comprises providing the control signal to an NMOS transistor configured to operate in a linear region.

3. The method of claim 1, wherein the providing a control signal to a variable impedance device configured to modify the RF signal further comprises providing a reactive component to the variable impedance device with a capacitor operably coupled to the variable impedance device.

4. The method of claim 1, further comprising selecting digital de-tuning by selecting a digital cloaking signal to generate the another control signal or selecting linear de-tuning by selecting a result from the comparing the DC signal to the reference voltage to generate the another control signal.

5. The method of claim 1, further comprising:
    generating a modulated signal with a voltage proportional to a current through the variable impedance device; and
    rectifying a receive signal from the modulated signal.

6. A wireless power receiver, comprising:
    means for generating an RF signal based on power wirelessly received;
    means for providing a control signal to a variable impedance device configured to modify the RF signal, the control signal having a voltage level, the variable impedance device configured to conduct a current that is proportional to the voltage level;
    means for rectifying the modified RF signal to generate a DC signal; and means for generating another control signal based on a voltage difference between the DC signal and a reference voltage.

7. The wireless power receiver of claim 6, wherein the providing a control signal to a variable impedance device configured to modify the RF signal further comprises means for providing the control signal to an NMOS transistor configured to operate in a linear region.

8. The wireless power receiver of claim 6, wherein the means for providing a control signal to a variable impedance device configured to modify the RF signal further comprises means for coupling a reactive component to the variable impedance device.

9. The wireless power receiver of claim 6, further comprising means for selecting digital de-tuning by selecting a digital cloaking signal to generate the another control signal or selecting linear de-tuning by selecting a result from the comparing the DC signal to the reference voltage to generate the another control signal.

10. The wireless power receiver of claim 6, further comprising:
means for generating a modulated signal with a voltage proportional to a current through the variable impedance device; and
means for rectifying a receive signal from the modulated signal.

11. A wireless power receiver, comprising:
a matching circuit coupled to a receive antenna, the matching circuit and the receive antenna configured to generate an RF signal based on power wirelessly received;
a de-tuning circuit operably coupled to the matching circuit and configured to modify the RF signal, the de-tuning circuit comprising a variable impedance device with a variable resistance configured to receive a control signal;
a rectifier operably coupled to the modified RF signal and configured to convert the modified RF signal to a DC signal; and
an analog comparator comprising a first input operably coupled to the DC signal, a second input operably coupled to a reference voltage, and a comparator output operably coupled to the variable impedance device and configured to generate another control signal based on a voltage difference between the first input and the second input.

12. The wireless power receiver of claim 11, wherein the variable impedance device comprises an NMOS transistor with a source and drain operably coupled between a ground and the RF signal and a gate operably coupled to the comparator output.

13. The wireless power receiver of claim 11, wherein the variable impedance device comprises back-to-back NMOS transistors operably coupled between a ground and the RF signal and gates of the gate back-to-back NMOS transistors operably coupled to the comparator output.

14. The wireless power receiver of claim 11, wherein the de-tuning circuit further comprises a passive network operably coupled between the variable impedance device and the RF signal, the passive network configured for providing a reactive component to an impedance of the de-tuning circuit.

15. The wireless power receiver of claim 11, wherein the analog comparator comprises:
a voltage divider for providing a comparison signal proportional to the DC signal; and
an amplifier with one input operably coupled to the comparison signal, another input operably coupled to the reference voltage, and an output operably coupled to the variable impedance device.

16. The wireless power receiver of claim 11, wherein the analog comparator comprises:
an operational transconductance amplifier (OTA) with one input operably coupled to the DC signal and another input operably coupled to the reference voltage to generate an OTA output; and
a buffer operably coupled between the OTA output and the variable impedance device.

17. The wireless power receiver of claim 11, further comprising a multiplexer operably coupled between the analog comparator and the de-tuning circuit with one input operably coupled to the comparator output, one input operably coupled to a digital cloaking signal, and an output operably coupled to the variable impedance device, wherein the multiplexer is configured to select digital de-tuning by selecting the digital cloaking signal or linear de-tuning by selecting the comparator output.

18. The wireless power receiver of claim 11, further comprising a signaling sensor comprising:
an impedance element operably coupled between the de-tuning circuit and the ground and configured to generate a modulated signal with a voltage proportional to a current through the variable impedance device; and
a signal extractor operably coupled to the modulated signal and configured to rectify the modulated signal to a receive signal.

19. A method for detecting a signal from a transmitter, comprising:
generating an RF signal based on power wirelessly received;
modifying, by a de-tuning circuit, a frequency of the RF signal to a frequency different from a resonant frequency;
generating a modulated signal with a voltage proportional to a current through the de-tuning circuit; and
rectifying the modulated signal to a receive signal, the receive signal responsive to a tuned state of the RF signal.

20. The method of claim 19, wherein the tuned state of the RF signal comprises substantially tuned to the resonant frequency or substantially de-tuned from the resonant frequency to a different frequency.

21. The method of claim 19, wherein modifying, by a de-tuning circuit, a frequency of the RF signal to a frequency different from a resonant frequency further comprises adjusting a variable impedance of the de-tuning circuit based on a control signal to modify the RF signal with resonance characteristics different from the RF signal.

22. The method of claim 21, wherein the tuned state of the RF signal comprises substantially tuned to the resonant frequency, substantially de-tuned from the resonant frequency to a different frequency, and partially de-tuned with an amplitude of the modified RF signal substantially less than an amplitude of the RF signal.

23. A wireless power receiver, comprising:
means for generating an RF signal based on power wirelessly received;
means for modifying, by a de-tuning circuit, a frequency of the RF signal to a frequency different from a resonant frequency;
means for generating a modulated signal with a voltage proportional to a current through the de-tuning circuit; and means for rectifying the modulated signal to a receive signal, the receive signal responsive to a tuned state of the RF signal.

24. The wireless power receiver of claim 23, wherein the tuned state of the RF signal comprises substantially tuned to the resonant frequency or substantially de-tuned from the resonant frequency to a different frequency.

25. The wireless power receiver of claim 23, wherein means for modifying, by a de-tuning circuit, a frequency of the RF signal to a frequency different from a resonant frequency further comprises means for adjusting a variable impedance of the de-tuning circuit responsive to a control signal to modify the RF signal with resonance characteristics different from the RF signal.

26. The wireless power receiver of claim 25, wherein the tuned state of the RF signal comprises substantially tuned to the resonant frequency, substantially do-tuned from the resonant frequency to a different frequency, and partially de-tuned with an amplitude of for the modified RF signal substantially less than an amplitude of the RF signal.

27. A wireless power receiver, comprising:
a matching circuit coupled to a receive antenna, the matching circuit and the receive antenna configured to generate an RF signal at a resonant frequency based on power wirelessly received;
a de-tuning circuit operably coupled to the matching circuit and configured to modify a tuning of the wireless power receiver to a frequency different from the resonant frequency of the RF signal;
an impedance element operably coupled between the de-tuning circuit and a ground and configured to generate a modulated signal with a voltage proportional to a current through the de-tuning circuit; and
a signal extractor operably coupled to the modulated signal and configured to rectify the modulated signal to a receive signal responsive to a tuned state of the wireless power receiver.

28. The wireless power receiver of claim 27, wherein the tuned state of the wireless power receiver comprises substantially tuned to the resonant frequency or substantially de-tuned from the resonant frequency to a different frequency.

29. The wireless power receiver of claim 27, wherein the de-tuning circuit further comprises a variable impedance device operably coupled between the RF signal and the impedance element, the variable impedance device comprising a variable resistance and configured to receive a control signal, the variable impedance device configured to generate a modified RF signal with resonance characteristics different from the RF signal based on the control signal.

30. The wireless power receiver of claim 29, wherein the tuned state of the wireless power receiver comprises substantially tuned to the resonant frequency, substantially de-tuned from the resonant frequency to a different frequency, and partially de-tuned with an amplitude of the modified RF signal substantially less than an amplitude of the RF signal.

* * * * *